Patented July 15, 1924.

1,501,873

UNITED STATES PATENT OFFICE.

DANIEL TYRER, OF STOCKTON-UPON-TEES, ENGLAND.

MANUFACTURE OF RED OXIDE OF IRON.

No Drawing. Application filed March 27, 1922. Serial No. 547,204.

*To all whom it may concern:*

Be it known that I, DANIEL TYRER, a subject of the King of Great Britain, residing in Stockton-upon-Tees, England, have invented a certain new and useful Improved Manufacture of Red Oxide of Iron, of which the following is a specification.

This invention relates to the manufacture of red oxide of iron, suitable for use as a pigment, from ferrous chloride, particularly the residue obtained by evaporating to dryness galvanizer's waste pickle in which the free hydrochloric acid has been neutralized, preferably by means of iron or a ferrous compound such as ferrous carbonate.

The ferrous chloride is subjected to the action of a heated mixture of air and water vapor, whereby ferric oxide and hydrochloric acid are produced. Under correct conditions the iron oxide thus formed is a bright red powder very suitable as a pigment.

The ferrous chloride is preferably made granular, best in pieces about the size of a pea, and may be exposed in thin layers to the action of the steam and air mixture heated to about 250–300° C.

For instance, the ferrous chloride made granular by vigorous stirring of a concentrated solution while the water is being evaporated at 100° C., is spread on the floor of a closed muffle furnace heated to the said temperature and the mixture of air and water vapor is passed through the muffle. The best mixture of air and water vapor is obtained by passing air at ordinary temperature through water kept at 60° C. The excess of air and water vapor carry forward the hydrochloric acid evolved and it is not a matter of indifference at what rate the hydrochloric acid is thus removed, that is to say, what is the degree of concentration of the HCl in the gas mixture leaving the muffle.

It may be stated generally that the colour of the product depends greatly upon this rate; for instance, if the heated mixture of air and water vapor is passed slowly through a considerable depth of solid ferrous chloride, a gas rich in HCl is formed but the red oxide is of poor colour. If, however, a rapid stream of the air and water vapor is passed over or through a thin layer, a very fine red product is obtained but the final gas is very weak in HCl. The optimum condition may be fixed by the strength of the liquid HCl which condenses when the resultant gas is cooled. Thus in the present example the gases leaving the muffle are cooled to normal temperature and care is taken that the condensate does not attain a greater concentration than 30 grams of HCl per 100 c. c., as indicated for instance by a hydrometer. In the condenser about 50 per cent of the HCl obtained is recovered. The remaining HCl may be recovered as a weak solution by scrubbing with water the air which passes through the condenser. This is practicable where a use can be found for a weak liquor. Otherwise the final gas may be scrubbed with waste pickle acid which, after neutralizing with iron, is evaporated and used again in the process.

A modification of the process consists in mixing with the ferrous chloride (preferably before evaporation) a quantity of an iron compound, decomposable under the conditions of the process and in a very fine state of subdivision. Hydrated ferric oxide and ferrous carbonate which may be the natural iron ores, are instances of suitable iron compounds, and in the case of the former as much as 60 or 70 per cent of the material may be present in the mixture which is to be heated in the current of air and water vapor. Such an admixture may enhance the colour of the product, and a higher temperature may be used without seriously spoiling the colour. For instance, the reaction may occur at about 350° C. when such a mixture is used, the product having still a very good red colour; the reaction at the higher temperature is naturally much accelerated as compared with that at the lower temperature.

The effect of the iron compound is in part a catalytic one. The presence of certain salts has also a catalytic effect in assisting the reaction; the salts in question are those of copper, magnesium, tin, sodium and potassium, of any one of which from 0.1 to 1 per cent, calculated on the weight of ferrous chloride present, may be added. The action of such salts is to accelerate the speed of the reaction and also, at least in the case of copper, to modify favourably the shade of red colour produced.

Having thus described the nature of the said invention and the best means I know of carrying the same into practical effect, I claim:—

1. A method of manufacturing red oxide of iron, which consists in passing a mixture of air and water vapour over solid ferrous chloride at a temperature of 250° to 300° C., then passing through a condenser the mixture of air and water vapour which has left the solid and maintaining the current of air and water vapor through the condenser at such a speed that the condensate does not attain a greater concentration than 30 grams of HCl per 100 c. c.

2. A method of manufacturing red oxide of iron, which consists in passing air at ordinary temperature through water at 60° C. and then passing the mixture of air and water vapour thus obtained over a layer of granular ferrous chloride at a temperature of 250° to 300° C.

3. A method of manufacturing red oxide of iron, which consists in mixing ferrous chloride with a quantity of an iron compound adapted to be decomposed at a temperature of 250° to 300° C. and in a very fine state of subdivision and passing a mixture of air and water vapour over this product at a temperature of 230° to 300° C.

4. A method of manufacturing red oxide of iron, which consists in mixing ferrous chloride with hydrated ferric oxide in a very fine state of subdivision and passing a mixture of air and water vapour over this product at a temperature of 250° to 300° C.

5. A method of manufacturing red oxide of iron, which consists in mixing ferrous chloride with a small proportion of a catalyst and passing a mixture of steam and water vapour over the ferrous chloride containing this catalyst at a temperature of 250° to 300° C.

In testimony thereof I have signed my name to this specification.

DANIEL TYRER.